US012294283B2

(12) United States Patent
Renotte et al.

(10) Patent No.: US 12,294,283 B2
(45) Date of Patent: May 6, 2025

(54) SYSTEM FOR COOLING A DRIVE DEVICE WITH SEVERAL ELECTRIC MACHINES

(71) Applicant: SAFRAN ELECTRICAL & POWER, Blagnac (FR)

(72) Inventors: Alexis Renotte, Moissy-Cramayel (FR); Julien Marc Nicolas Rambaud, Moissy-Cramayel (FR); Christophe Castelli, Moissy-Cramayel (FR); Guillaume Porte, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 371 days.

(21) Appl. No.: 17/790,674

(22) PCT Filed: Jan. 18, 2021

(86) PCT No.: PCT/FR2021/050082
§ 371 (c)(1),
(2) Date: Jul. 1, 2022

(87) PCT Pub. No.: WO2021/148744
PCT Pub. Date: Jul. 29, 2021

(65) Prior Publication Data
US 2023/0040452 A1    Feb. 9, 2023

(30) Foreign Application Priority Data
Jan. 20, 2020   (FR) ...................................... 2000521

(51) Int. Cl.
*H02K 9/14*        (2006.01)
*H02K 9/08*        (2006.01)
(Continued)

(52) U.S. Cl.
CPC ................. *H02K 9/14* (2013.01); *H02K 9/08* (2013.01); *H02K 9/18* (2013.01); *H02K 11/33* (2016.01)

(58) Field of Classification Search
CPC ............ H02K 9/08; H02K 9/18; H02K 11/33
See application file for complete search history.

(56) References Cited

U.S. PATENT DOCUMENTS

| 2005/0140230 A1* | 6/2005 | Johnson ................. H02K 29/10 903/917 |
| 2017/0037776 A1* | 2/2017 | Jones ..................... B64D 41/00 |
| 2020/0010208 A1* | 1/2020 | Peace .................... F04D 25/082 |

FOREIGN PATENT DOCUMENTS

| EP | 0 786 853 A1 | 7/1997 |
| EP | 2 774 853 A1 | 9/2014 |

(Continued)

OTHER PUBLICATIONS

WO-2014135431-A1_translate (Year: 2014).*
HR International Search Report as issued in International Patent Application No. PCT/FR2021/050082, dated Mar. 11, 2021.

*Primary Examiner* — Burton S Mullins
*Assistant Examiner* — Mohammed Ahmed Qureshi
(74) *Attorney, Agent, or Firm* — Pillsbury Winthrop Shaw Pittman LLP (57) ABSTRACT

A cooling system for a drive device with several electric machines, the cooling system including a hydraulic circuit for a coolant including a cooling part in a gearbox of the drive device for cooling the gearbox, and an air/coolant heat exchanger including cooling walls forming channels for circulating coolant for the cooling thereof, an air cooling circuit including a plurality of fans, rotationally coupled to the gearbox, a cooling part between the cooling walls of the air/liquid heat exchanger, wherein the air sucked in and (Continued)

propelled by the fans circulates by sweeping over the cooling walls in order to cool them.

13 Claims, 6 Drawing Sheets (51) Int. Cl.
*H02K 9/18* (2006.01)
*H02K 11/33* (2016.01)

(56) References Cited

FOREIGN PATENT DOCUMENTS

JP       S61-227650 A    10/1986
WO   WO-2014135431 A1 *  9/2014  ............. B64D 33/08

* cited by examiner

SYSTEM FOR COOLING A DRIVE DEVICE WITH SEVERAL ELECTRIC MACHINES

CROSS-REFERENCE TO RELATED APPLICATIONS

This application is the U.S. National Stage of PCT/FR2021/050082, filed Jan. 18, 2021, which in turn claims priority to French patent application number 2000521 filed Jan. 20, 2020. The content of these applications are incorporated herein by reference in their entireties.

TECHNICAL FIELD OF THE INVENTION

The technical field of the invention is that of a propeller-propulsion drive system comprising a drive device with several electric machines and the cooling system thereof.

The present invention relates to the cooling of a drive device with several electric machines and in particular the cooling of the coolant of the drive device.

TECHNOLOGICAL BACKGROUND OF THE INVENTION

Devices for driving at least one propeller are known comprising an electric or thermal machine and a gearbox driven or driving the electric machines and the propeller or a turbine.

The electric machines can each be an electric motor driving the gearbox or an electric generator driven by the gearbox for example in the case of a drive device with several electric machines for hybrid propeller or an electric machine having a motor mode and a generator mode.

Devices are in particular known for driving at least one propeller which are motorised via electric machines for vehicles of the vertical take-off and landing type also known under the acronym VTOL. These drive devices can comprise several electric machines which are electric motors and a gearbox driven by the electric motors.

Electric propeller drive devices can comprise an air/oil exchanger to cool the oil circulating in the gearbox and the electric machines can also be cooled by this oil, in particular the electronic part. The air/oil exchanger can be cooled by a fan device comprising a propeller driven by an electric motor.

There are also hybrid or thermal propeller-propulsion drive systems comprising a drive device for the generating of electrical energy comprising electric machines which are in this case electric generators producing electricity from energy by being coupled to a gearbox driven by a thermal engine. In case of an oil leak or defective fan device, the thermal engine and the gearbox are sized to have enough thermal energy to allow for landing. However the electric generators may not have enough electrical energy and switch to failure mode beyond a predetermined temperature and generate a risk of discharged battery.

For electric or hybrid propeller drive devices, in case of a breakdown of one of the electric motors, the other electric motors can make it possible to move about in degraded mode as such land the vehicle. The electric machines, in particular the power units of electric machines include power components that heat quickly if they are not cooled and, beyond a temperature, switch to safety mode. The time between the moment of failure and the switching to safety mode of the motors can be too short to allow for landing. An independent cooling system can thus be developed for each electric machine, but this generates extra weight and extra cost.

There is therefore a need for a system for cooling a drive device with several electric machines that makes it possible to improve the cooling by providing the cooling is case of a breakdown while still optimising the weight and the extra cost of the machine.

SUMMARY OF THE INVENTION

The invention offers a solution to the problem described hereinabove of a defective motor or fan, by making it possible to have a redundant cooling system, by having an oil circuit cooled by several fans thus making it possible in case of breakdowns of a fan that the air and oil cooling circuits continue to be cooled.

An aspect of the invention relates to a cooling system for a drive device with several electric machines, the cooling system comprising:
  a hydraulic circuit for a coolant comprising:
    a cooling part in a gearbox of the drive device for cooling said gearbox, and
    an air/coolant heat exchanger comprising cooling walls forming channels for circulating coolant for the cooling thereof,
  an air cooling circuit comprising:
    a plurality of fans, rotationally coupled to the gearbox,
    a cooling part between the cooling walls of the air/liquid heat exchanger, wherein the air sucked in and propelled by the fans circulates by sweeping over the cooling walls in order to cool them.

Thanks to the invention, due to the fact that there are several fans that thus ensure that the coolant is cooled in the heat exchanger, even in the case of a breakdown of an electric motor, there will be at least one other fan operating to cool the cooling liquid. Furthermore there is no additional electric motor to drive the fans, i.e. dedicated solely for driving fans. Furthermore, given that the gearbox is cooled by a hydraulic system of which the liquid is cooled by a redundant ventilation, there is less heating of the gearbox that can this make it possible to decrease its inertia and therefore its volume or/and to increase the service life of the gearbox.

In addition to the characteristics that have just been mentioned in the preceding paragraph, the cooling system according to one or more embodiments of the invention can have one or more additional characteristics from among those mentioned in the following paragraphs, taken individually or according to any technically permissible combinations.

According to an embodiment, the cooling part in a gearbox of the drive device for cooling said gearbox is moreover a lubrication part of the flush-mounting box.

According to an embodiment, the air cooling circuit comprises at least one fan per electric machine and each fan is rotationally coupled to the corresponding electric machine. The fact that there is one fan per electric machine coupled with the latter, thus assure that the coolant is cooled in the heat exchanger, even in the case of a breakdown of an electric motor, there will be at least one other fan with another electric machine operating to cool the cooling liquid.

According to an embodiment, the air cooling circuit comprises a machine air conduit, ventilated by the fans, for cooling one of the electric machines. This makes it possible that in case of an oil leak, the electric machine is always cooled by the ventilation of air. Furthermore in the case of a combination with the preceding embodiment, this makes it possible to use the ventilation of air of the electric machines both for the electric machine and for the heat exchanger.

According to an example of this embodiment, the machine air conduit is a part of a power electronics assembly of the electric motors to cool components of the power electronics assembly. This makes it possible that the power electronics assembly of the electric machine is always cooled by the ventilation of air.

According to an example of this embodiment, the machine air conduit makes it possible to cool a winding of a stator of the electric machine. This makes it possible that the winding of the electric machine is always cooled by the ventilation of air except if the electric machine is defective in which case it is no longer necessary to cool the winding.

According to an embodiment, the air cooling circuit comprises an inlet opening passing through a front wall of a casing of the drive device to cause air to enter into the air cooling circuit.

According to an example of this embodiment, the inlet opening is axial in relation to an axis of the propeller of the propulsion drive system.

The term "axial inlet" means that it passes through a wall axially in relation to an axis of the propeller of the propulsion drive system.

According to an example of this embodiment, the inlet opening is radial. The term "radial inlet" means that it passes through a wall radially in relation to an axis of the propeller.

According to an example of this embodiment, the air cooling circuit comprises inlet openings surrounding the gearbox of the drive device with several electric machines. The inlet openings can be axial, radial or both.

According to an example of this embodiment, the air cooling circuit comprises one air inlet opening per electric machine.

According to an embodiment of this example, the air cooling circuit comprises one guide conduit per inlet opening to circulate the air from the inlet opening to at least one electric machine. This makes it possible to improve the flow rate of the air and therefore the cooling by the air cooling circuit.

According to an example of this embodiment, each air inlet opening is angularly adjacent between two electric machines and each guide conduit comprises two channels each extending from one of the two adjacent electric machines to an upstream channel extends from the inlet opening. This makes it possible in case of a guide conduit, the electric machine is cooled at least by the air coming from the other guide conduit.

According to an embodiment, the air cooling circuit comprises an exchanger conduit to guide the air from at least one fan to the exchanger. This makes it possible to directly guide the air from the fan to the exchanger and therefore improve the air/coolant thermal exchange.

According to an embodiment, the hydraulic circuit comprises an electric machine part conduit for cooling one of the electric machines. This makes it possible to have better cooling than by ventilation with air or to be redundant with the cooling with air in the case where the air cooling circuit comprises an electric machine air conduit. The electric machine part conduit is different from the air/liquid heat exchanger of the hydraulic circuit. The electric machine part conduit makes it possible to cool the machine part even if this conduit can furthermore be cooled by air although the air/liquid heat exchanger is designed to cool its hydraulic liquid, the heat exchanger can be in contact with a part of the electric machine to cool this part but is not part of the machine. The air/liquid heat exchanger is therefore external to each electric machine.

According to an example of this embodiment, the electric machine part conduit comprises a part of a power electronics assembly of the electric motors to cool components of the power electronics assembly. This makes it possible to have better cooling than by ventilation. Furthermore in the case of a combination with the example of the preceding embodiment wherein the power electronics assembly is cooled by ventilation, this can make it possible to have a cooling redundancy and to cool in case either of a defective fan or in case of an oil leak.

According to an implementation of this example of this embodiment, the hydraulic circuit is arranged to cool the offset power electronics assemblies of the electric motors of the electric machines.

The term "offset power electronics assembly of the electric motors" means the power components electrically supplying the electromagnetic parts of the electric machines (rotor and stator) are not directly fixed to the machine casing supporting the electromagnetic parts of the electric machine. For example, the power electronics units of each electric machine are grouped together in a power unit of the propulsion system fixed to a casing of the propulsion system.

According to an example of this embodiment, the electric machine part makes it possible to cool a winding of a stator of the electric machine. This makes it possible to have better cooling than by ventilation. Furthermore, in the case of a combination with the example of the preceding embodiment wherein the winding is cooled by ventilation, this can make it possible to have a cooling redundancy and to cool in case either of a defective fan or in case of an oil leak.

According to an embodiment, each electric machine part conduit of the hydraulic circuit is located in the stator or/and a part of a power electronics assembly of the electric motors to cool components of the power electronics assembly. According to an example, each electric machine can comprise a lubrication circuit in the rotor separated from the hydraulic circuit to lubricate the bearings of the electric machine.

According to an embodiment the coolant circuit comprises a coolant tank to provide the coolant to the gearbox and a pump to circulate the coolant from the gearbox to the coolant tank via the air/coolant exchanger.

Another aspect of the invention relates to a propeller-propulsion drive system with several electric machines comprising:
  a drive device comprising:
    a plurality of electric machines comprising a rotor, a stator and a casing,
    a gearbox comprising:
      one gear per electric machine, each meshed with the rotor of the electric machine,
      at least one propulsion wheel meshed via gears with each rotor of electric machine, and
    the cooling system according to one of the characteristics described hereinabove.

The propeller-propulsion drive system with several electric machines according to one or more embodiments of the invention can have one or more additional characteristics among those mentioned in the following paragraphs, taken individually or in any technically permissible combination.

According to an embodiment each electric machine further comprises a power electronics assembly.

According to an example, the power electronics assembly of each electric machine is located between the fan and the rotor.

According to another example, the power electronics assembly is located between the rotor and the bearing support before or between the stator and the casing of the electric machine. For example, the electronic unit is located between machine air conduits.

According to an embodiment the drive system comprises an electronic unit comprising power electronics units of each electric machine, the hydraulic circuit being arranged to cool the electronic unit.

According to an example of this embodiment, the electronic unit is in contact against the heat exchanger to cool it.

According to an example of the two preceding embodiments, the air cooling circuit comprises an exchanger air intake conduit wherein the electronic unit is located, the exchanger air intake conduit comprising an open end connected to the heat exchanger.

According to an embodiment of this example, the exchanger air intake conduit comprises one channel per fan each comprising an opening connected to the electric machines.

According to an embodiment the air/liquid heat exchanger is separated and moved away from each electric machine (the term "separated and moved away from" means that the heat exchanger is not in contact).

According to an embodiment the air/liquid heat exchanger is separated and moved away from the stator and rotor of the electric machine. According to an example of this embodiment the electronic unit is in contact against the heat exchanger to cool it.

According to an embodiment, the drive device comprises a casing to receive the gearbox and the plurality of electric machines, and the air cooling circuit comprises at least one inlet opening passing through the casing to suck in the exterior air by the fans and a removal of the air and an air outlet opposite the inlet opening.

According to an embodiment, each electric machine comprises the corresponding fan integral in rotation with the rotor of the corresponding electric machine.

According to an alternative of the preceding embodiment, the gearbox comprises at least two fans and each fan is coupled via a fan gear to the rotors of the electric machines. The fan gear thus comprises a gear wheel that is part of the fan meshed with a gear wheel of the gearbox, for example an intermediate gear wheel, or directly with the propulsion wheel. According to an example, the gearbox comprises one fan per electric machine.

According to an embodiment, the system comprises a clutch between each electric machine and the gearbox.

According to an embodiment, the gearbox comprises for each electric machine, an intermediate machine wheel between the rotor and the propulsion wheel. This makes it possible to increase either the speed or the torque at the propulsion wheel with respect to the electric machines.

The invention and its different applications shall be better understood when reading the following description and when examining the accompanying figures.

BRIEF DESCRIPTION OF THE FIGURES

The figures are shown for the purposes of information and in no way limit the invention.

FIG. 4b shows a partial block diagram of an axial semi-section view of the electric machine of FIG. 4a.

DETAILED DESCRIPTION

Figure 1:
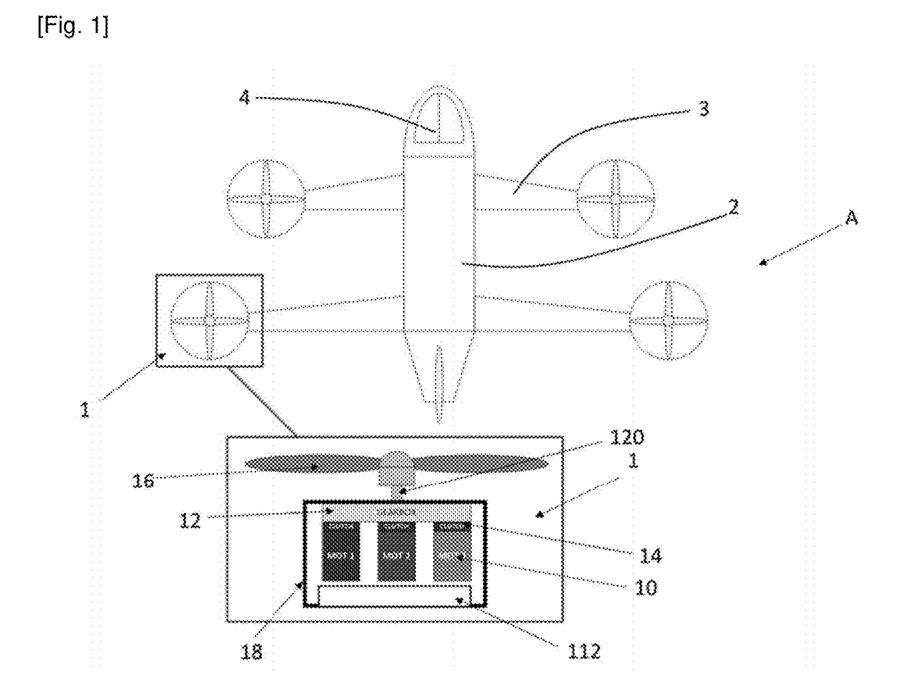
FIG. 1 shows a block diagram of an example of a vertical take-off and landing vehicle comprising a propeller-propulsion drive system with several electric machines comprising a cooling system according to a first or a second embodiment of the invention.

FIG. 1 shows a representation of a block diagram of a vertical take-off and landing vehicle A.

The vertical take-off and landing vehicle A further comprises a transport body 2 comprising a fuselage, four wings 3 extending from the fuselage, and a cabin 4 at the front of the fuselage and furthermore at each end of the wings 3, a propeller-propulsion drive system with several electric machines 1.

Of course the vertical take-off and landing vehicle A is an example and can comprise more or less propeller-propulsion drive system with one or more electric machines 1 and can be located in other positions, in particular in the fuselage or in the wings 3.

FIG. 1 shows a diagrammatical enlargement of the propeller-propulsion drive system with several electric machines 1, called drive system 1 in what follows. The drive system 1 comprises a drive device with several electric machines, called drive device in what follows. The drive device here comprises three electric machines 10 but could comprise only one, two or more than three, for example four electric machines 10. Each electric machine 10 comprises a rotor 100 comprising a rotor shaft 1002 extending axially, a stator 102 comprising a winding surrounding the rotor 100, a machine casing 104 surrounding and supporting the stator 102 and comprising two bearings at each end of the rotor 102 axially to support the rotor shaft 1002, shown in FIG. 2 described in detail in what follows.

Figure 2:
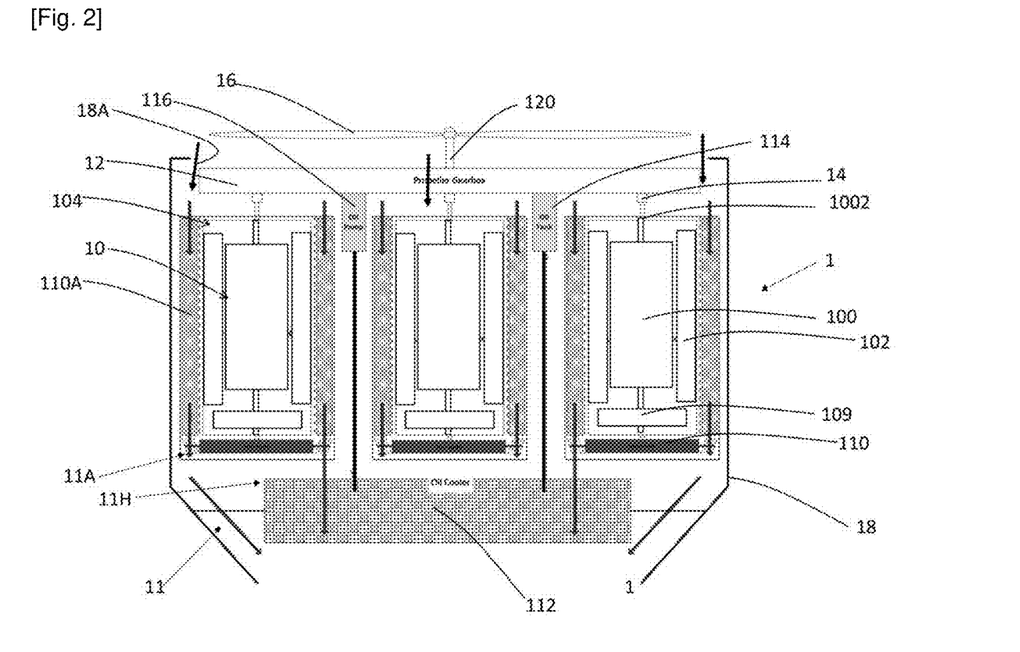
FIG. 2 shows a block diagram according to an axial section of the propeller-propulsion drive system with several electric machines, comprising a cooling system according to a first example of the first embodiment of the invention.

FIG. 2 shows a block diagram of the drive system 1 shown in FIG. 1. The block diagram shows, according to an axial cross-section view, the electric machines 10. The electric machines 10 are shown in the block diagram aligned but are in this example distributed about an axis of rotation of the propeller. Here, the electric machines are arranged regularly about the axis of rotation of the propeller. Thus, each axis of rotation of the rotor of each machine is located at the apex of an equilateral triangle to reduce the size.

The drive device further comprises a gearbox 12 meshed with each electric machine 10.

Here, in this example the drive system 1 further comprises one clutch 14 per electric machine 10 between the gearbox 12 and the rotor shaft 1002 of the corresponding electric machine 10. In other words, the clutch can, in a disengaged position, decouple the rotor shaft 1002 of the corresponding electric machine 10 with the gearbox 12 and in an engaged position, couple the rotor shaft 1002 of the corresponding electric machine 10 with the gearbox 12.

The gearbox 12 comprises a propulsion output shaft 120 comprising the axis of rotation of the propeller 16, coupled using gears with each rotor shaft 1002 when the corresponding clutch 14 is in the engaged position.

Figure 5:
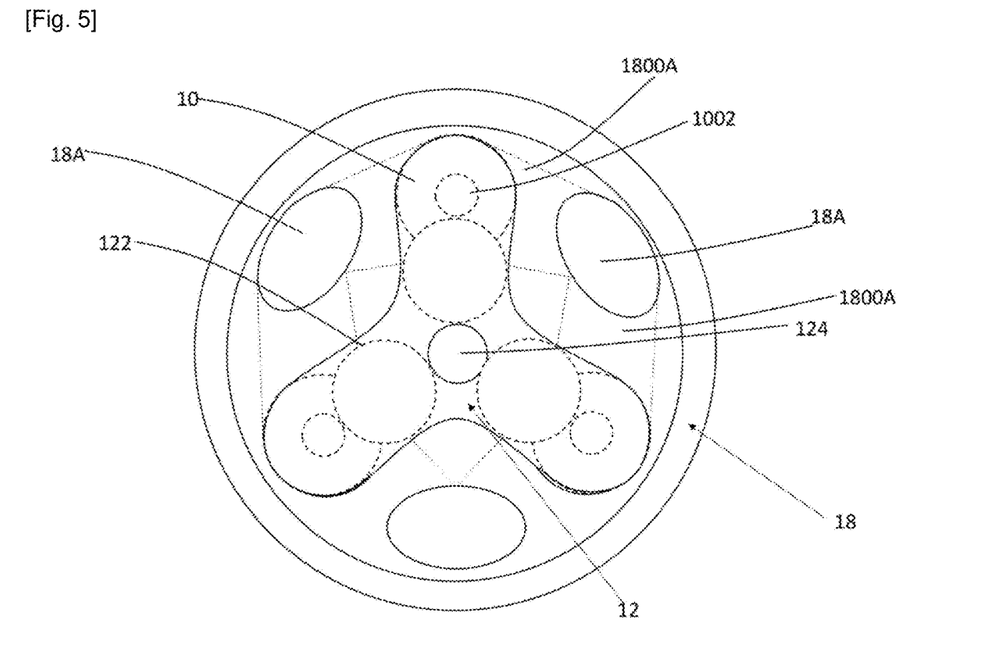
FIG. 5 shows a block diagram according to a top view of an example of the propeller-propulsion drive system with several electric machines of FIG. 3.

The gear of the gearbox 12, shown in FIG. 5, can comprise intermediate gear wheels between the propulsion output shaft 120 and a gearwheel directly coupled to the rotor shaft of a corresponding machine. For example, the gearbox comprises one intermediate machine wheel 122 per electric machine. They are each coupled with a gear wheel linked with the rotor shaft 1002 of an electric machine and a propulsion wheel 124 rotationally coupled to the propulsion output shaft 120 or directly driving the propulsion output shaft 120.

The drive system 1 further comprises at least one propeller 16, here a single propeller comprising four blades, driven by the propulsion wheel of the meshing device 12 of the drive device. Of course, the propeller can comprise less or more than four blades for example between two and ten blades. The drive system 1 can comprise for example more than one propeller, for example two coaxial propellers.

The drive system 1 comprises a cooling system 11 to cool the drive device according to a first example of a first embodiment.

The cooling system 11 comprises a hydraulic circuit 11H for a coolant and air cooling circuit 11A.

The hydraulic circuit 11H comprises a cooling part in the gearbox 12 to cool it.

The hydraulic circuit 11H comprises an air/coolant heat exchanger 112, a coolant tank 114 to provide the coolant to the gearbox and a pump 116 to circulate the coolant from the gearbox 12 to the coolant tank 114 via the air/coolant exchanger 112. According to another example, the pump circulates the coolant from the tank 114 to the gearbox 12 via the exchanger and the coolant tank 114. The air/liquid heat exchanger 112 is designed to cool its hydraulic liquid. The air/liquid heat exchanger 12 is external to each electric machine 10 but can be in contact with a part of an electric machine 10 to cool this part without being part of the electric machine 10.

The coolant here is oil in this embodiment, but could be another coolant.

The exchanger 112 comprises in a known manner cooling walls forming channels for circulating coolant for the cooling thereof by air circulating between these circulation channels.

In this embodiment, the cooling part in the gearbox 12 of the hydraulic circuit 11H is inside the gearbox 12 allowing the oil to be in direct contact with the gears to furthermore lubricate the gears.

The drive system 1 further comprises in this example, a casing 18 containing the gearbox 12, the electric machines 10 and the cooling system 11 comprising the hydraulic circuit 11H for a coolant and the air cooling circuit 11A. The gearbox 12, the electric machines 10 and the exchanger 112 of the hydraulic circuit 11H are fixed to the casing 18.

The air cooling circuit 11A comprises a plurality of fans 110, rotationally coupled to the gearbox 12.

In particular, in this first embodiment, the air cooling circuit 11A comprises one fan 110 per electric machine 10. Each fan is rotationally coupled to the rotor shaft 1002 of the rotor 100 of the corresponding electric machine 10. Here, each fan 110 is directly rotationally coupled to the rotor 100 and comprises the same axis of rotation.

Each fan thus makes it possible in this first embodiment to suck in or expulse air in order to circulate air in the casing 18 to cool the electric machines 10.

Furthermore, in this first embodiment, the casing 18 comprises air inlet openings 18A all around the gearbox 12 in order to allow external air to enter into the casing 18. The inlet openings 18A are therefore also part of the air cooling circuit 11A and are here axial front inlet openings 18A located on a front wall of the casing between the propeller 16 and the gearbox 12 but the inlet openings could also be radial for example in a wall of the casing surrounding the electric machines.

The air circulating in the drive system, is represented by arrows. The air enters through the openings 18A through the suction of the fans 110 sweeps (licks) over the surfaces of the gearbox 12, then cools each electric machine 10, then sweeps over the walls of the air/coolant exchanger 112 forming the channels wherein the coolant, here oil, circulates. Finally, the air escapes through one or several rear axial openings, here a single rear axial opening. The term "rear" means the part of the drive system opposite the propeller located therefore at the front.

Figure 3:
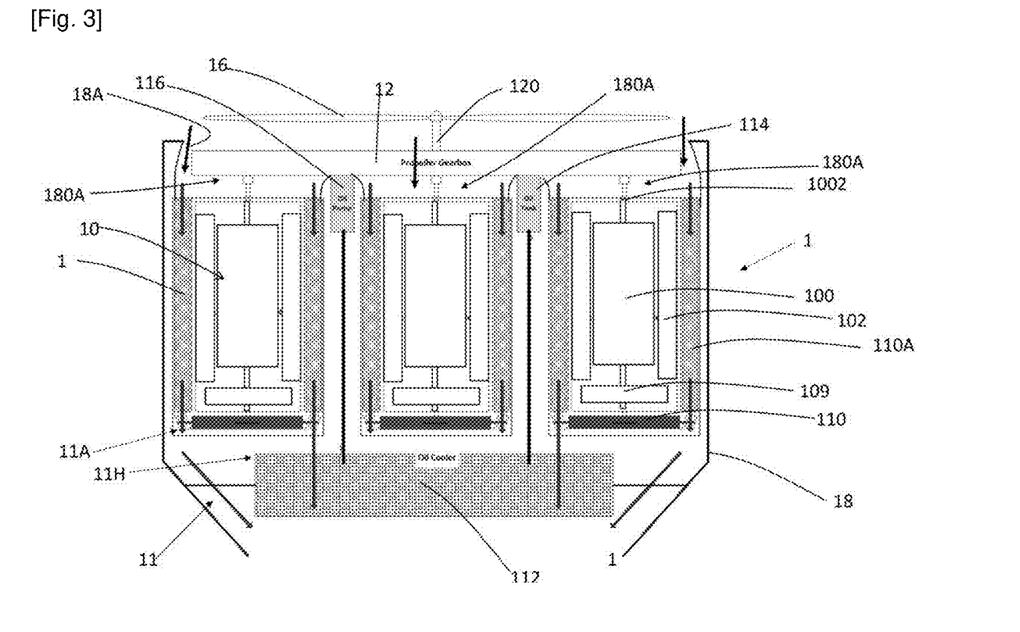
FIG. 3 shows a block diagram according to an axial section of the propeller-propulsion drive system with several electric machines comprising a cooling system according to a second example of the first embodiment of the invention.

FIG. 3 shows a second example of the first embodiment of the cooling system of the invention. In this example, the air cooling circuit 11A comprises one front guide conduit 180A per electric machine 10 each extending from an inlet opening 18A axially passing through the casing 18 to the corresponding electric machine 10. Such a guide conduit makes it possible to improve the Air heat exchange of the electric machines. In particular, in this example, each air inlet opening is angularly adjacent to two electric machines by being angular located between the two electric machines 10 and each guide conduit comprises two channels 1800A extending from the inlet opening to each one of the two adjacent electric machines 10.

FIG. 5 shows a top view of the drive device of the propeller-propulsion drive system with several electric machines of FIG. 3 wherein it is possible to see as a dotted line the channels 1800A of the conduit 180A. In other words, each electric machine 10 receives air circulating through two channels coming from two inlet openings. This makes it possible to have, in case of a clogged conduit, air sucked in by another guide conduit.

Of course there could be a conduit having a single channel connecting the inlet opening dedicated to a single electric machine 10 but in case of a clogged conduit or clogged inlet opening, the flow rate of the air sucked in by the fan dedicated to the machine would be insufficient to cool the electric machine.

To improve the cooling of the electric machines 10 in these two examples of this first embodiment, the air cooling circuit 11A comprises at least one machine air conduit 110A per electric machine 10. Each electric machine 10 therefore comprises a machine air conduit 110A.

Figure 4A:
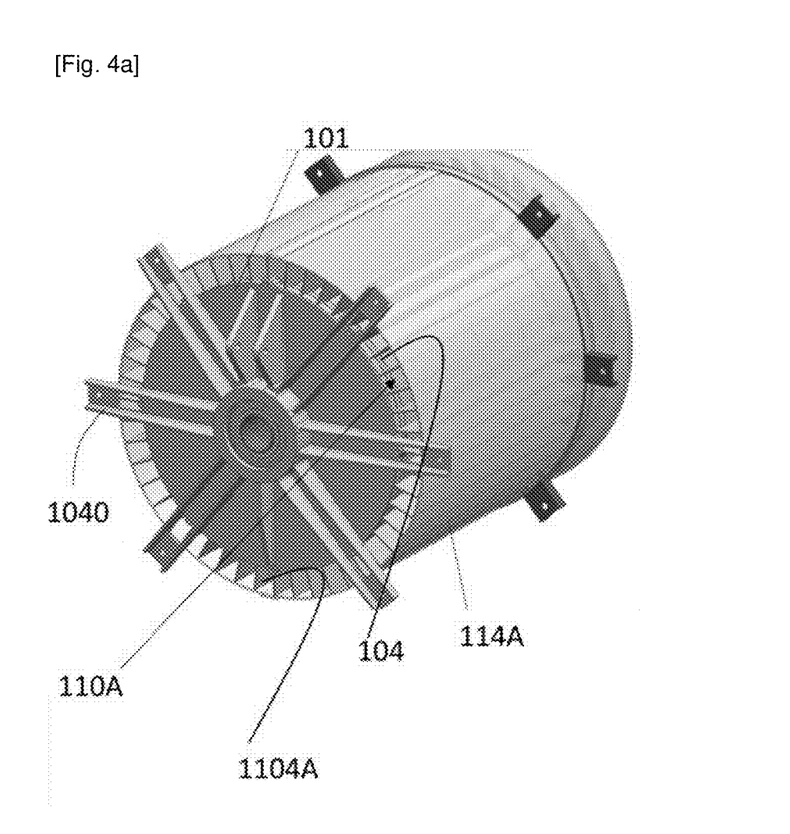
FIG. 4a shows a block diagram according to a three-dimensional view of an electric machine of the propeller-propulsion drive system with several electric machines of the first or second example of this embodiment.
Figure 4B:
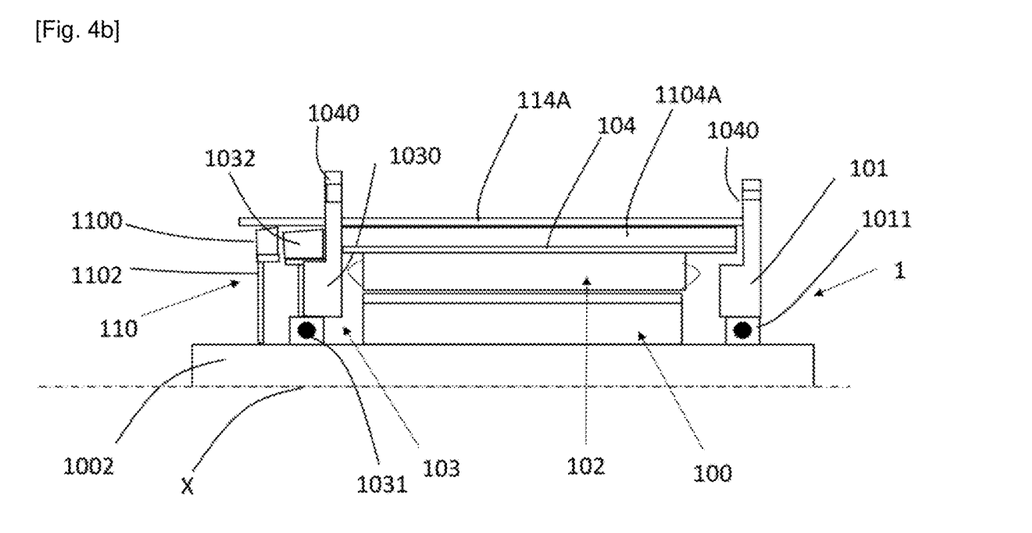

FIG. 4a shows an electric machine 10 in perspective respectively seen from the rear wherein the machine air conduit 110A can be seen. FIG. 4b shows a block diagram of a axial semi-cross section of the electric machine 10.

Each electric machine 10 comprises an external cylindrical wall 114A surrounding the machine casing 104. The machine air conduit 110A being delimited between the machine casing 104 and the external cylindrical wall 114A.

The machine air conduit 110A is in the second example of this embodiment, connected to the two guide conduits 18A.

In these examples of this embodiment, each electric machine 10 comprises a front bearing support 101 extending radially and comprises one of the two bearings, here a roller bearing 1011, passed through by the rotor shaft 1002. The front bearing support 101 thus closes an airgap between the rotor 100 and the stator 102. Here the front bearing support 101 is mounted against the machine casing 104.

Furthermore, in these examples of this embodiment, each electric machine 10 comprises a rear bearing support 103 visible in FIG. 4b extending radially comprising a support plate 1030 and a bearing 1031, here a roller bearing, in particular ball bearing passed through by the rotor shaft 1002. The rear bearing support 103 is fixed to the machine casing 104 and here to the casing 18.

In these examples of this embodiment, each electric machine 10 comprises fixing brackets 1040 extending from the machine casing 104 to be fixed to the casing 18. Here in this example the front bearing support 101 and the rear bearing support 103 each comprise the fixing brackets 1040 extending radially and passing through the machine casing 104 to be fixed to the casing 18.

In these examples of this embodiment, each electric machine 10 further comprises a power electronics assembly 109. The power electronics assembly 109 is in this example located between the fan 110 and the rotor 100 but could also be between the rotor 100 and the front bearing support 101 or around the electric motor 10.

Furthermore in these two examples of this embodiment, each fan 110 comprises a set of external blades 1100, and an intermediate crown 1102 from which radially extends the set of external blades 1100 outwards with respect to the axis of rotation X of the rotor shaft 1002.

The set of external blades 1100 is in rotation facing the machine air conduit 110A.

Furthermore in these two examples of this first embodiment, the machine air conduit 110A comprises fins 1104A axially running along the machine casing 104 forming between them a plurality of cooling channels. The fins 1104A each extend from the machine casing 104 to cool it and as such therefore cool the stator and as such the windings of the stator in order to increase the yield thereof.

The support plate 1030 further comprises a set of internal blades 1032 of which one blade is visible in FIG. 4b. Each internal blade 1032 is curved and fixed to the casing 18 and extends facing the conduit 110A to guide the air ventilated by the fan 110 in a plurality of channels of the machine air conduit 110A.

Figure 6:
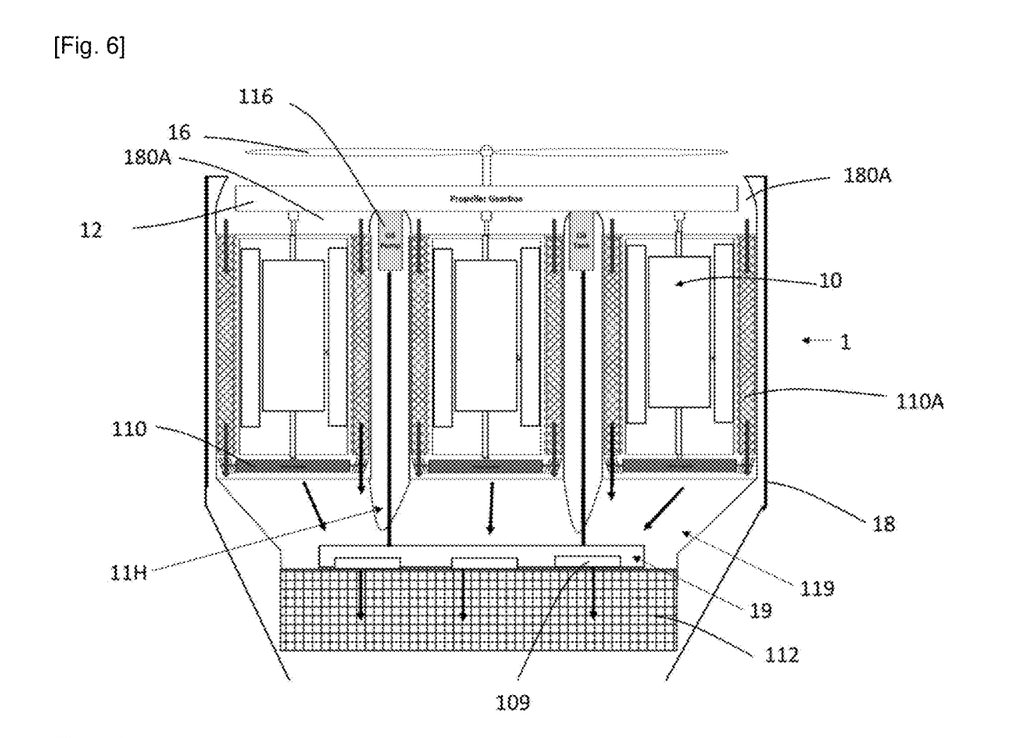
FIG. 6 shows a block diagram according to an axial section of the propeller-propulsion drive system with several electric machines comprising a cooling system according to a third example of this embodiment of the invention.

FIG. 6 shows a cooling system 11 according to a third embodiment.

The cooling system 11 according to a third example of the first embodiment is identical to the second example except in that the power electronics units 109 of each electric machine 10 are offset and grouped together in a power electronics unit 19 and in that the air ventilation conduit 11A further comprises an exchanger air intake conduit 119 to guide the air from at least one fan 110 to the exchanger 12.

Here, in this example the power electronics unit 19 is located in the exchanger air intake conduit 119 against the exchanger 12 in order to make it possible to cool the power unit via the air cooling circuit 11A and by the hydraulic circuit 11H.

Figure 7:
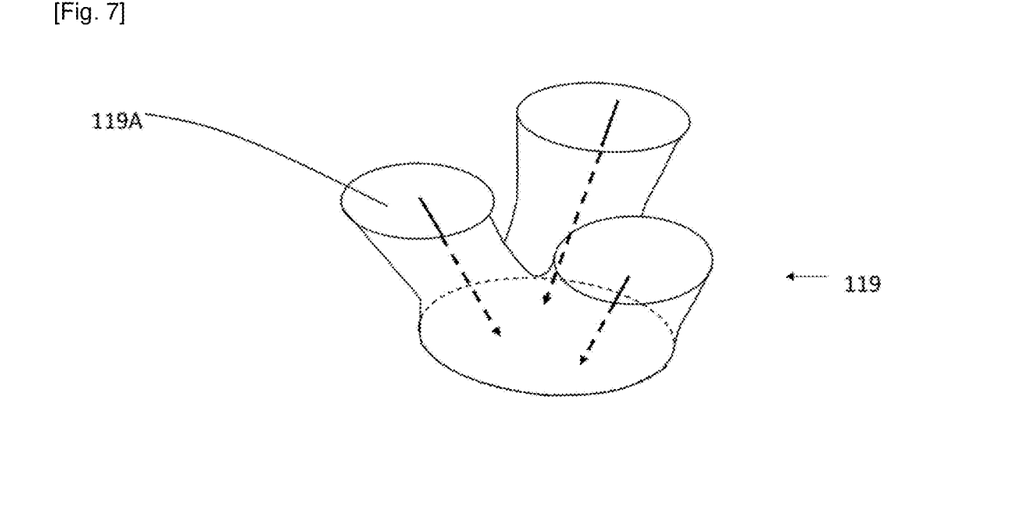
FIG. 7 shows a block diagram according to a three-dimensional view of a multiple-channel conduit of the cooling system according to the third embodiment of the invention.

The power electronics unit 19 can include fins and openings passing through it in order to improve the cooling thereof, the openings able to be a machine air conduit. Furthermore the exchanger air intake conduit 119 comprises one channel 119A per fan 110. FIG. 7 shows a block diagram in perspective of the exchanger air intake conduit 119. The arrows show the direction of circulation of the air in the channels 119A. This exchanger air intake conduit 119 can also be installed on the two preceding examples.

Figure 8:
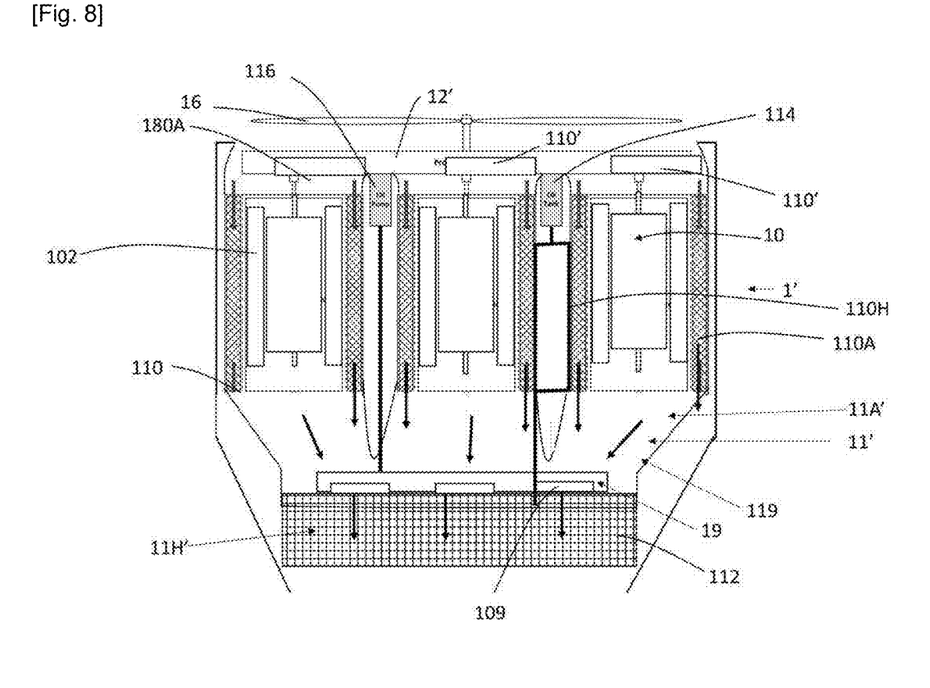
FIG. 8 shows a block diagram according to an axial section of the propeller-propulsion drive system with several electric machines comprising a cooling system according to an example of the second embodiment.
Figure 9:
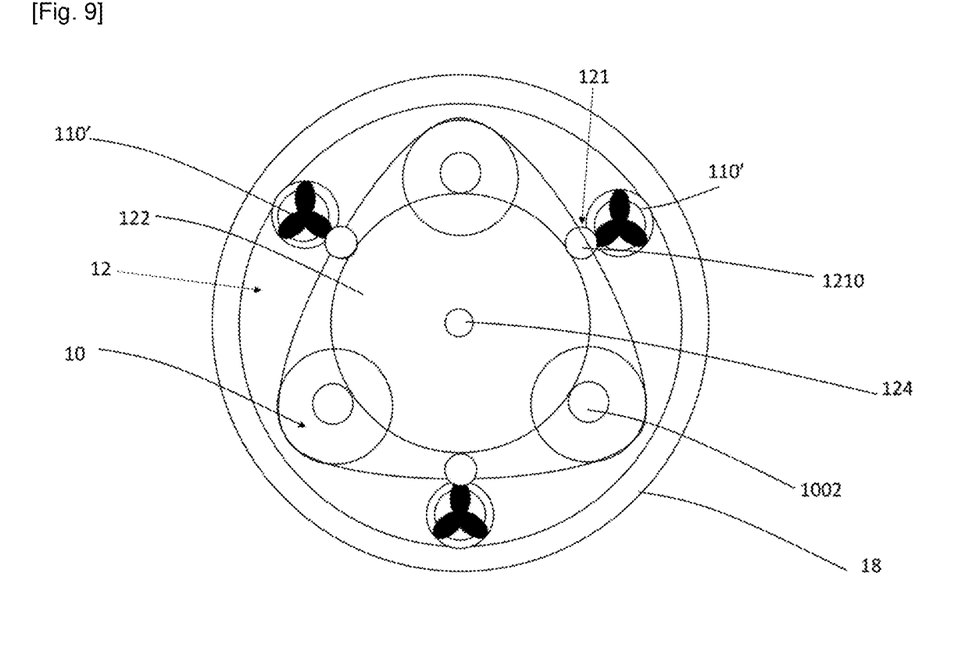
FIG. 9 shows a block diagram axial top view of a propeller-propulsion drive system with several electric machines comprising a cooling system according to a second embodiment.

FIGS. 8 and 9 show a block diagram respectively according to an axial section view and an axial view of the front, of a propeller drive system 1' comprising a cooling system 11' different from the third example of the first embodiment wherein the gearbox 12' comprises the fans 110' du air cooling circuit 11A' and wherein the hydraulic circuit 11H' comprises at least one electric machine part conduit 110H for cooling one of the electric machines 10. The propeller drive system 1' therefore comprises one fan gear 121, shown in FIG. 9, per fan to couple each fan to the propulsion wheel 122. The fan gear 121 here comprises an intermediate gear wheel 1210 meshed with a gear wheel of the fan 110'.

In this example embodiment, the air cooling circuit 11A' comprises as in the first embodiment one fan 110' per electric machine but could comprise only two or more than three of them.

The hydraulic circuit 11H' here comprises one electric machine part conduit 110H per machine of which only two are shown in FIG. 8 to each cool the stator 102 of the corresponding electric machine 10. In particular in this example, the hydraulic circuit 11H' comprises a second electric machine part passing through the power electronics unit 19 also making it possible to cool it. In this example, the electric machine part conduit 110H is located between an outlet of the heat exchanger 112 and an inlet of the oil tank 114 but could be according to the other example wherein the coolant circulates in the other direction, between an inlet of the pump 116 and an outlet of the heat exchanger 112. In these two examples, the cooling fluid, here oil is therefore cooled in the heat exchanger 112 before circulating in the electric machine part conduit 110H.

Of course, according to embodiments, not shown, other examples of the first embodiment, the hydraulic circuit 11H' can be as in one of these two examples. In particular in the case of examples of electronic units 109 located in the electric machine casing 104, the machine part conduit can either cool the electronic unit 109 via the machine casing 104 or comprise a circuit passing through the machine casing 104 to be in contact with a support dissipater of the electronic unit 109.

Furthermore according to another example not shown, the air cooling circuit 11A' of this second embodiment can be devoid of the exchanger air intake conduit 119 as in the first example or the second example of the first embodiment. Of course, in this second embodiment, the power electronics assembly can be integrated into each electric machine as in the first example or the second example of the first embodiment or grouped together into a power electronics unit 19.

Furthermore according to another example not shown, the air cooling circuit 11A' of this second embodiment can be devoid of the guide conduit 180A as in the first example of the first embodiment.

Furthermore according to another example not shown, the air cooling circuit 11A' of this second embodiment can comprise the fans 110 of the electric machines 10 as in the examples of the first embodiment.

In these examples of these two embodiments, the electric machines are electric motors but could also comprise an electric generator mode driven by the gearbox for example in the case where the propeller-propulsion drive system is of the hybrid type and further comprises a thermal engine driving the gearbox.

In these examples of these two embodiments, the electric machines are electric motors but could also be generators of an energy generating system of which the gearbox would be driven by a thermal engine for example a gas turbine, thermal piston engine or a propeller in generator mode.

According to an embodiment not shown, the propeller-propulsion drive system further comprises a fuel cell of which the air cooling circuit and/or the hydraulic circuit makes it possible to cool the fuel cell. For example the fuel cell is integrated into the casing 18.

Of course, in all these examples the propeller 16 can also contribute to the ventilation of the air entering into the casing 18 of the drive device 1 or 1'. The drive device 1 or 1' can comprise more than one propeller 16 for example two propellers.

Unless specified otherwise, the same element appearing in different figures has a unique reference.

The invention claimed is:

1. A cooling system for a drive device with a plurality of electric machines, the cooling system comprising:
   a hydraulic circuit for a coolant comprising:
      a cooling part in a gearbox of the drive device for cooling said gearbox, and
      an air/coolant heat exchanger comprising cooling walls forming channels for circulating coolant for cooling the coolant,
   an air cooling circuit comprising:
      a plurality of fans, rotationally coupled to the gearbox,
      a cooling part between the cooling walls of the air/liquid heat exchanger,
      wherein air sucked in and propelled by the fans, circulates by sweeping over the cooling walls in order to cool the cooling walls.

2. The cooling system according to claim 1, wherein the air cooling circuit comprises at least one fan per electric machine and wherein each fan is rotationally coupled to the corresponding electric machine.

3. The cooling system according to claim 1, wherein the air cooling circuit comprises at least one machine air conduit, ventilated by the fans, for cooling at least one of the plurality of electric machines.

4. The cooling system according to claim 3, wherein the at least one machine air conduit is a part of a power electronics assembly of the plurality of electric machines to cool components of the power electronics assembly.

5. The cooling system according to claim 3, wherein the at least one machine air conduit makes it possible to cool a winding of a stator of the at least one of the plurality of electric machines.

6. The cooling system according to claim 1, wherein the hydraulic circuit comprises at least one electric machine part conduit for cooling one of the plurality of electric machines.

7. A propeller-propulsion drive system with a plurality of electric machines comprising:
   a drive device comprising:
      a plurality of electric machines comprising a rotor, a stator and a casing, a gearbox comprising:
         one gear for each electric machine, each electric machine meshed with the rotor of the corresponding electric machine,
         at least one propulsion wheel meshed via the gear with each rotor of electric machine,
   a cooling system according to claim 1.

8. The propeller-propulsion drive system according to claim 7, wherein each electric machine further comprises a power electronics assembly.

9. The propeller-propulsion drive system according to claim 8, comprising an electronic unit comprising power electronics units of each electric machine and wherein the hydraulic circuit is arranged to cool the electronic unit.

10. The propeller-propulsion drive system according to claim 7, comprising an electronic unit comprising power electronics units of each electric machine and wherein the air cooling circuit comprises a part to cool the electronic unit.

11. The propeller-propulsion drive system according to claim 7, wherein each electric machine comprises the corresponding fan integral in rotation with the rotor of the corresponding electric machine.

12. The propeller-propulsion drive system according to claim 7, wherein the gearbox comprises at least two fans and wherein each fan is meshed by a gear coupled to the rotors of the electric machines.

13. An electrical propulsion vehicle with vertical take-off and landing comprising a transport body and at least one propeller-propulsion drive system with several electric machines according to claim 7 and at least one propeller rotationally coupled to the meshed propulsion wheel.

* * * * *